US009022598B2

(12) United States Patent
Lee (10) Patent No.: US 9,022,598 B2
(45) Date of Patent: May 5, 2015

(54) COMPACT LIGHT MIXING ILLUMINATOR, UTILIZING THE FOURIER TRANSFORM OF PATTERNED SOLID-STATE SURFACE LIGHT EMITTING ARRAYS

(75) Inventor: Jeffrey Lee, El Sobrante, CA (US)

(73) Assignee: DiCon Fiberoptics Inc., Richmond, CA (US)

( * ) Notice: Subject to any disclaimer, the term of this patent is extended or adjusted under 35 U.S.C. 154(b) by 506 days.

(21) Appl. No.: 13/035,705

(22) Filed: Feb. 25, 2011

(65) Prior Publication Data

US 2012/0218747 A1 Aug. 30, 2012

(51) Int. Cl.
*F21V 9/00* (2006.01)
*G02B 27/46* (2006.01)

(52) U.S. Cl.
CPC . *F21V 9/00* (2013.01); *G02B 27/46* (2013.01); *Y10S 362/80* (2013.01)

(58) Field of Classification Search
CPC ........... G02B 27/26; G02B 27/46; F21V 9/00
USPC .................. 362/230, 231, 235, 561, 232, 800
See application file for complete search history.

(56) References Cited

U.S. PATENT DOCUMENTS

| 6,939,009 B2 * | 9/2005 | Fischer et al. .................. 353/43 |
| 7,209,624 B2 * | 4/2007 | Reynolds et al. ............. 385/133 |
| 2010/0177253 A1 * | 7/2010 | Golub ............................... 349/8 |

OTHER PUBLICATIONS

Goodman, "Introduction to Fourier Optics," 3rd Edition, *Roberts & Company*, 2005, pp. 103-106, 220-221.

\* cited by examiner

*Primary Examiner* — Anh Mai
*Assistant Examiner* — Jessica M Apenteng
(74) *Attorney, Agent, or Firm* — Davis Wright Tremaine LLP (57) ABSTRACT

One embodiment of the invention is directed to a light mixing illuminator for illuminating an object, comprising an array of light emitting elements wherein at least some of the elements emit light of different wavelengths. An optical device is employed that focuses the light from the elements to a Fourier plane of the device, wherein the light emitting elements are arranged so that at least the zero spatial frequency components of light of the different wavelengths from the elements substantially overlap in a region at the Fourier plane. An objective is used to project the region onto the object. A mask is used that selectively blocks some of spatial frequency components of light from the elements without blocking the zero spatial frequency components of light from reaching the object.

15 Claims, 11 Drawing Sheets

PRIOR ART

ARRAY
FIG. 1C(a)

DIFFUSED IMAGE
FIG. 1C(b)

ARRAY
(a)

MASK
(c)

FT OF ARRAY
(b)

FIG. 3B

FILTERED IMAGE (after mask)
(d)

FT OF FILTERED IMAGE
(e)

MASK
(c)

FT OF ARRAY
(b)

FIG. 3C

FILTERED IMAGE (after mask)
(d)

FT OF FILTERED IMAGE
(e)

COMPACT LIGHT MIXING ILLUMINATOR, UTILIZING THE FOURIER TRANSFORM OF PATTERNED SOLID-STATE SURFACE LIGHT EMITTING ARRAYS

BACKGROUND

Color mixing occurs when light of a certain wavelength is spatially superimposed upon light of another wavelength. An example of this is the mixing of red, green, and blue light, such as might be emitted from red, green, and blue Light Emitting Diodes, to give what our eyes perceive to be white light, or other mixed colors. Many prior art surface light emitting arrays utilize a light scrambler such as a diffuser to mix the light. Because different wavelengths are emitted from spatially segregated regions on the array, the approach used with these prior art arrays has been to spread the light such that it overlaps on the imaging plane. Unfortunately, this has been an inefficient approach since in order to better mix the light, aggressive scramblers that provide more spreading or scattering of the light have to be used. This makes it increasingly difficult to collect the light efficiently, partly due to the increase in etendue. Thus most prior art light or color mixing devices that utilize light scramblers and diffusers tend to be either energy inefficient or expensive, since optics with high numerical apertures would need to be used to collect the increasingly spread light.

SUMMARY

One embodiment of the invention is directed to a light mixing illuminator for illuminating an object, comprising an array of light emitting elements wherein at least some of the elements emit light of different wavelengths. An optical device is employed that focuses the light from the elements to a Fourier plane of the device, wherein the light emitting elements are arranged so that at least the zero spatial frequency components of light of the different wavelengths from the elements substantially overlap in a region at the Fourier plane. An objective is used to project the region onto the object. A mask is used that selectively blocks some of spatial frequency components of light from the elements without blocking the zero spatial frequency components of light from reaching the object.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIGS. 1C(a) and 1C(b) show numerical simulations of the prior art light mixing device from FIG. 1A in which light from the array in FIG. 1B is scrambled using a 20° diffuser to produce a blurred and diffused image.

FIGS. 3B(a) through 3B(e) show a numerical simulation of the embodiment in FIG. 3A where the three-color surface-emitting array shown in FIG. 3B(a) is used as the input, and the mask in FIG. 3B(c) is used to block unwanted light.

FIG. 3C(a) through 3C(e) show a numerical simulation of the embodiment in FIG. 3A where the three-color surface-emitting array of concentric rings shown in FIG. 3C(a) is used as the input, and the mask in FIG. 3C(c) is used to block unwanted light.

FIGS. 4A and 4B are two different representations of embodiments using LEDs for generating the input shown in FIG. 3C(a). FIG. 4A shows LEDs constructed as rings, whereas

For simplicity in description, identical components are labeled by the same numerals in this application.

DETAILED DESCRIPTION

One embodiment of present invention above utilizes the fact that extended and non-overlapping light emitting sources arranged in an array with a specific pattern, may overlap in the Fourier space. Furthermore, rather than merely blurring or smearing the original image of the array in the spatial domain, filtering and blurring can also be done in Fourier space where it may be both easier to implement and more effective. The Fourier Transform of an image is essentially a distribution of frequencies of sine waves whose weighted sum is the original image. Conveniently, Fourier Transforms can be done optically via a single lens, and thus they can easily be exploited in many optical systems. A detailed explanation of Fourier Optics can be found in the reference text: Goodman, Joseph W. *Introduction to Fourier Optics*, 3$^{rd}$ Edition. Greenwood Village, Colo.: Roberts & Company, 2005.

Consider the case where an input object is placed in front of a lens of focal length f. Let the amplitude of the optical input, in our case the light emitting array, be represented by $t_A$. By assuming that the paraxial approximation (small angle approximation) is valid over the distance d from the object to the lens and also neglecting the finite extent of the lens as an aperture, the distribution at distance f behind the lens (back focal plane) is $$U_f(u,v) = \frac{A\exp\left[j\frac{k}{2f}\left(1-\frac{d}{f}\right)(u^2+v^2)\right]}{j\lambda f} * $$

$$\int\int_{-\infty}^{\infty} t_A(\xi,\eta)\exp\left[-j\frac{2\pi}{\lambda f}(\xi u + \eta v)\right]d\xi d\eta,$$

$$\text{Intensity} = I = |U|^2$$

where (u, v) and (ξ, η) are rectangular coordinates in Fourier plane and input plane, respectively, and λ is the wavelength. In the special case that d=f, the exponential phase curvature=1, and we have a perfect Fourier transform. To summarize, the 2D Fourier Transform of an input object will be at the back focal plane of the lens, which is why it is also referred to as the Fourier plane.

In many ways, working in the Fourier plane is ideal for color mixing and filtering. Consider an array geometry where the different wavelength regions are arranged as concentric rings. Although the rings are separate on the array, their Fourier Transforms are concentric Airy patterns with the vast majority of the optical power distributed in the center. Thus the Fourier Transform has produced a well-mixed optical output without a significant loss of power. Another advantage of using lenses for doing optical Fourier Transforms is that certain spatial frequencies can be filtered easily by physically masking off the signal in the Fourier plane. Take for instance a grid or checkerboard array which is also the most commonly used pattern/geometry in Light Emitting Diode (LED) arrays. Because there is a constant periodicity to spacing and dimensions of the LEDs within the grid, filtering is especially easy in the Fourier plane, although it will be understood that periodicity is, not required for the embodiment to achieve its purpose for color mixing and filtering. The Fourier Transform is a distribution of evenly spaced spots, again with the vast majority of the optical power distributed at the center. This center corresponds to zero frequency and the spots further away correspond to increasingly, high frequencies. By masking off all the higher frequencies (which is easier where there is periodicity to spacing and dimensions of the LEDs within the grid) one is left with only low frequencies that contain only low order information regarding the pattern of the grid, and is hence ideal for blurring or homogenizing the optical output. In one implementation of an embodiment, all spatial frequencies are substantially filtered out except for the zeroth order. This may be accomplished, for example, by means of a pin hole aperture in a mask, where the light input is from a light source similar to that in any one of FIGS. 3C(a), 4A and 4B described below.

One embodiment includes a compact illuminator that uses a patterned solid-state light emitting array and its Fourier Transform to output bright and spatially homogenized light. Color mixing is achieved via imaging the Fourier Transform, by arranging the array such that different regions overlap in the Fourier plane and/or by filtering/blurring frequencies. Apertures or masks can be used to block, and therefore filter, frequencies on the Fourier plane. The optical Fourier Transform is performed using a single lens or composite lens set, and subsequent optics can be used to process the image of the transform. Though Light Emitting Diode (LED) arrays will be discussed primarily herein for one embodiment, the patterned solid-state light emitting array may be implemented by means of various other devices such as Organic Light Emitting Diodes (OLED), Vertical-Cavity Surface-Emitting Lasers (VCSEL), liquid crystal displays, carbon nano-tube field emitting displays and other surface emitting light sources as well.

Figure 1A:
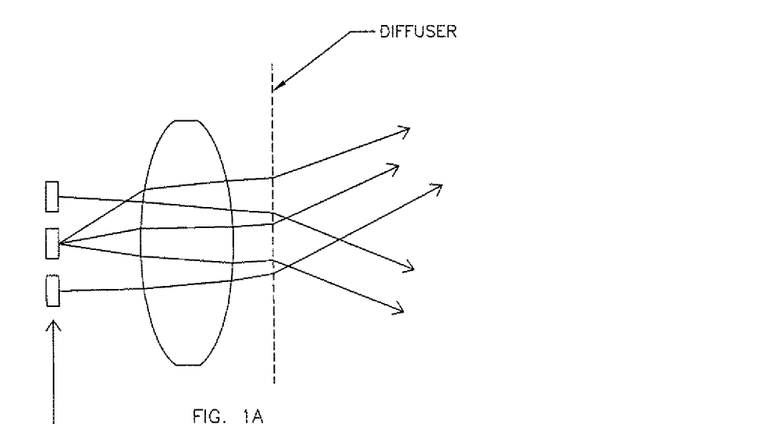
FIG. 1A is a representation of a prior art light mixing device that utilizes an LED array and a diffuser plate.
Figure 1B:
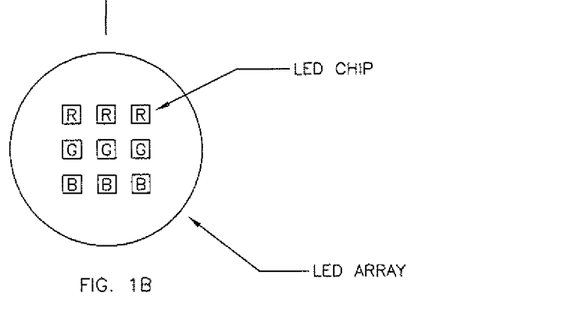
FIG. 1B is a representation of the prior art LED array from FIG. 1A in which different colored LED chips are arranged as three separate rows (Red (R), Green (G) and Blue (B)) in the array.
Figure 1C:
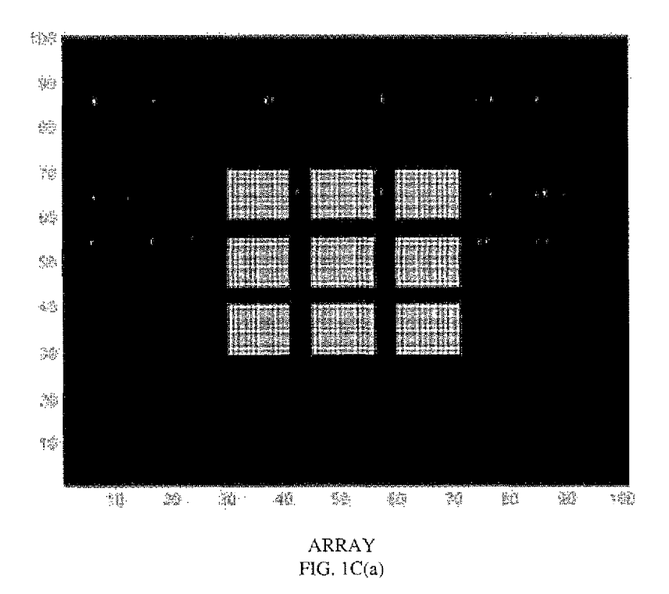
Figure 2:
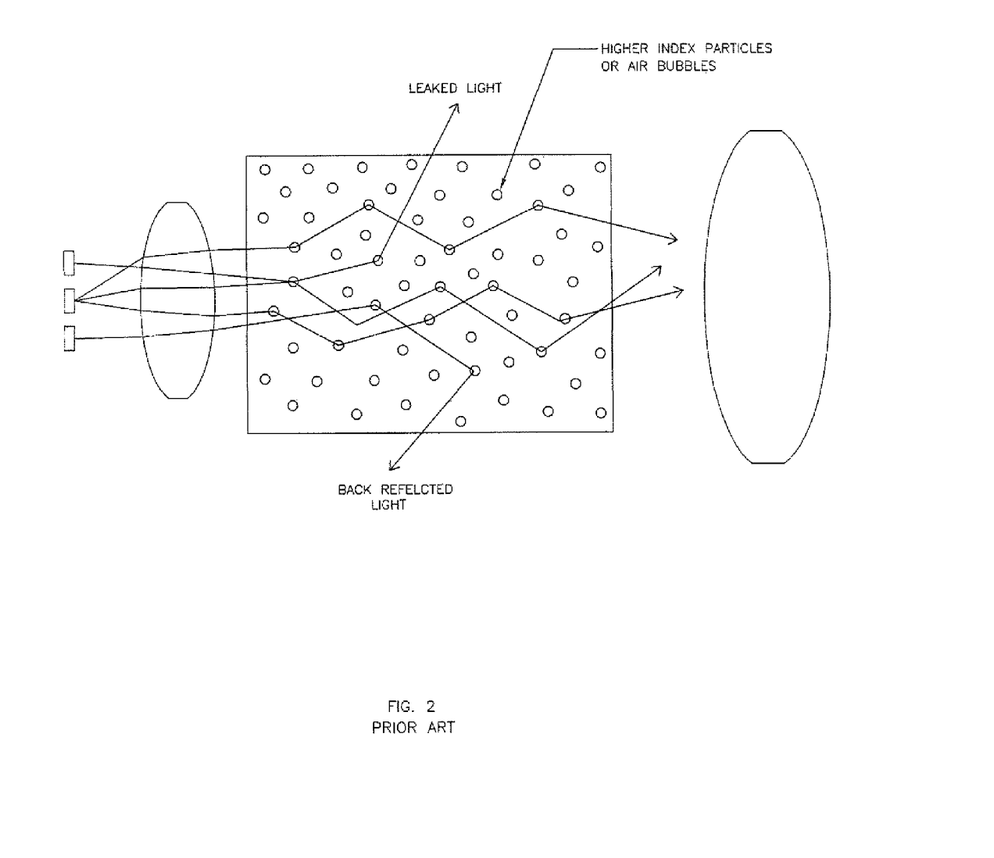
FIG. 2 is a representation of a prior art light mixing device that utilizes an LED array and light mixing rod.

Patterned solid-state light emitting arrays are becoming increasingly popular as both designers and users realize their potential as multiple-color sources. One popular representation of a prior art device utilizes array(s) that contain red, blue, and green LEDs whose output power can be individually controlled and mixed to create compound colors such as purple, orange, yellow, cyan, and white. The degree to which these illuminators can produce these colors, and the uniformity of the resulting color, is dependent on the ability to mix the light that is outputted from different regions of the arrays. Prior art illuminators that utilize patterned solid-state light emitting arrays typically do not effectively mix light or in doing so lose a significant amount of optical power. They tend to utilize aggressive light scramblers such as diffuser plates or light mixing rods, as shown in FIG. 1A and FIG. 2, respectively, which either excessively spread the light and make it difficult to collect, or else they lose a lot of light via high angle scattering and back reflections. The goal of these light scramblers is to spatially superimpose light from different regions of the arrays, at the illumination plane. The diffusers work by spreading and blurring the image of the array such that the images from different regions overlap with one another. FIG. 1B is a representation of the prior art LED array from FIG. 1A in which different colored LED chips are arranged as three separate rows (Red (R), Green (G) and Blue (B)) in the array. FIG. 1C(a) show an image of the array as projected by the lens in FIG. 1A. FIG. 1C(b) shows a numerical simulation of the light from the patterned array of nine LED chips in FIG. 1B after the lens and after the light is scrambled using a 20° diffuser to produce a blurred and diffused image.

Light mixing rods work by randomly scattering the light entering the rod such that by the time the light exits the rod, all spatial information of the light entering the rod is lost and what exits is a homogeneously mixed spot beam. Increasing the length of the rod and the number of scattering particles within the rod results in greater homogeneity of the light output, but also contributes to power loss. Some light is scattered at high angles, which results in light that either leaks out the sides of the rod, or back reflections. Thus with light mixing rods, there is a direct tradeoff between homogeneity/mixing and intensity.

The present invention utilizes the same kind of solid-state light emitting arrays as those used by prior art color mixing illuminators, but is specifically patterned to take advantage of the Fourier Transform method. In many cases, the multi-color light is much easier to mix in the Fourier plane where the separation between colors is smaller, and in some special cases the multiple colors are even superimposed. Using Fourier Transforms and accessing the frequency domain to filter or reshape signals has been well established and practiced for many years, especially in the fields of signal processing and optical imaging. The present invention, however, applies it to solid-state surface emitting arrays where the characteristic regular geometries of the surface pattern make it ideal for working in the frequency domain and hence with the Fourier Transform method to achieve uniform color mixing.

Figure 3A:
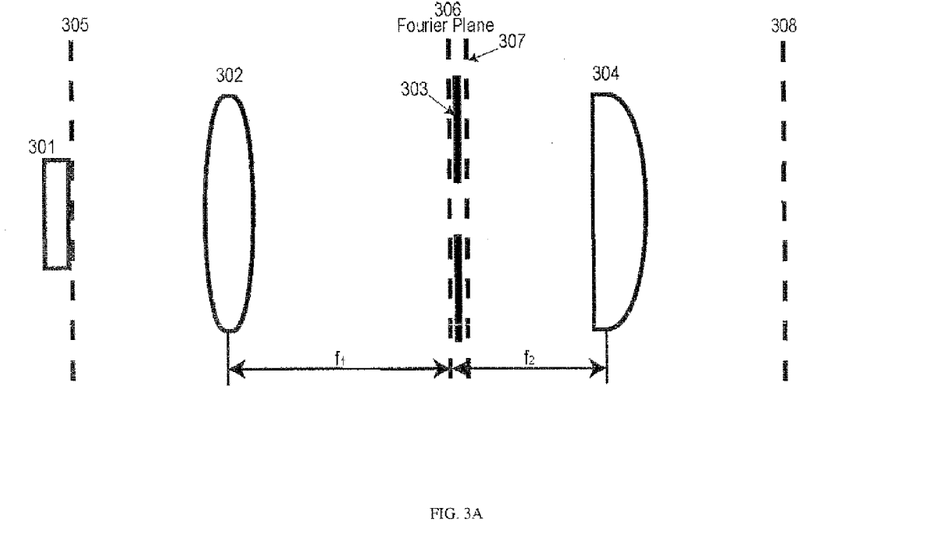
FIG. 3A is a representation of one embodiment of the present invention.
Figure 3B:
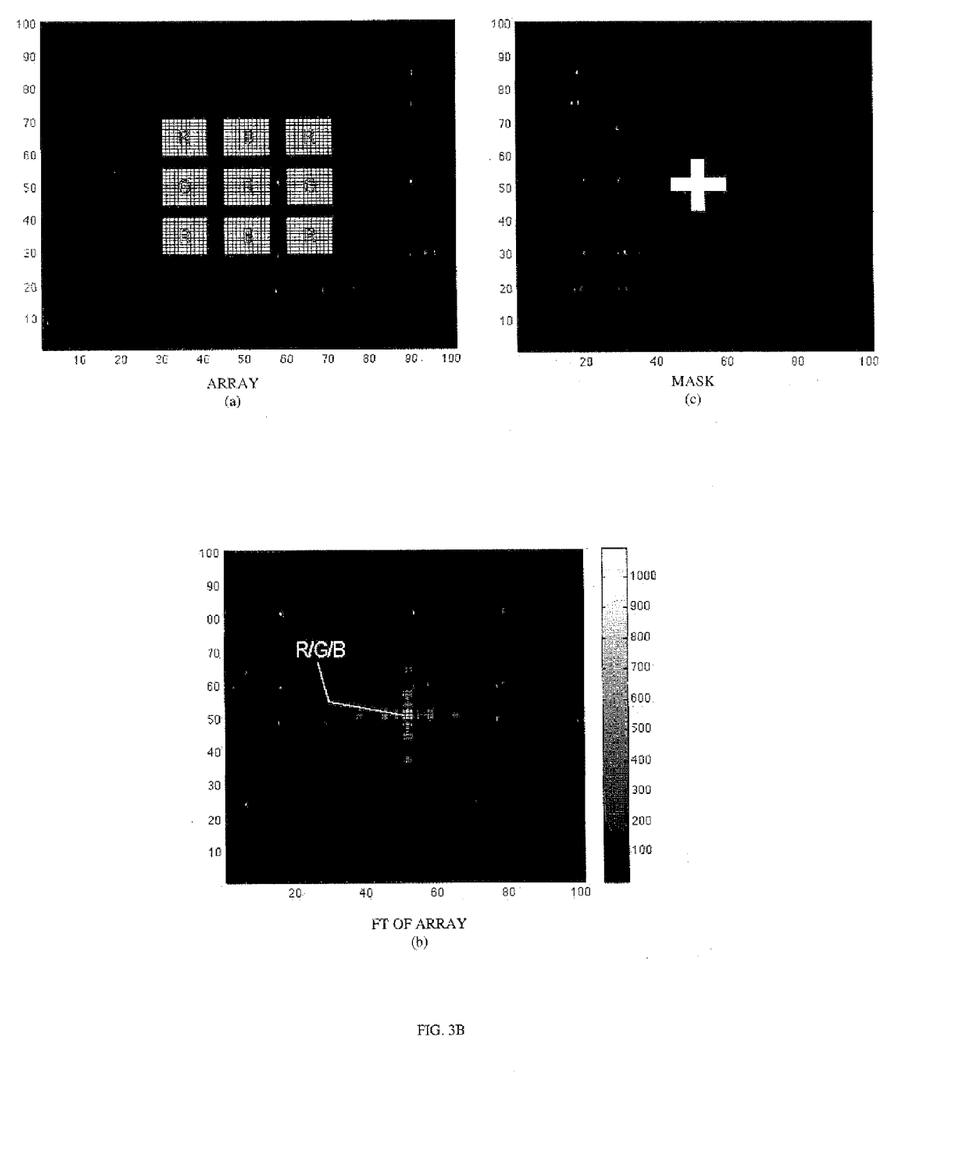
Figure 3C:
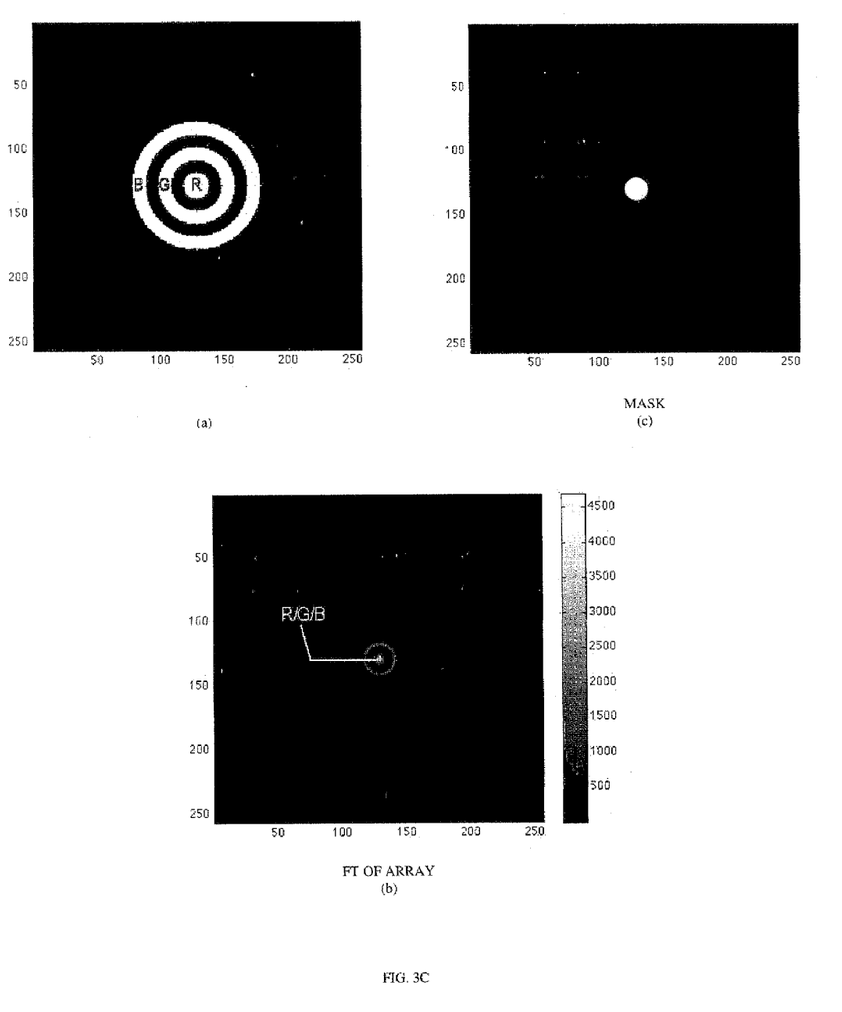
Figure 4A:
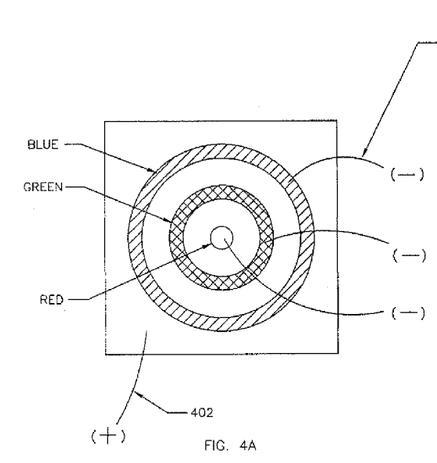
Figure 4B:
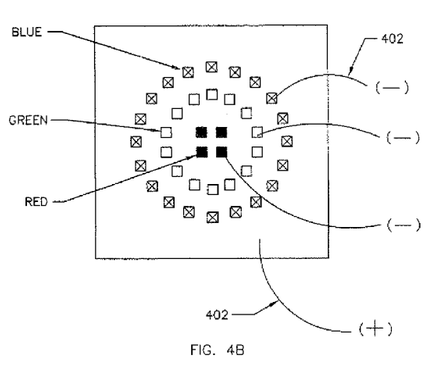
FIG. 4B shows smaller LED chips arranged to approximate rings.

A representation of one embodiment along with several numerical simulations are shown in FIGS. 3A-3C(e). One of the greatest conveniences of doing Fourier Transforms with optics is that it can be done almost exactly using a single lens, or with a composite lens set that reduces aberrations. In FIG. 3A, a positive double-convex lens (302) with focal length $f_1$, creates a Fourier Transform of the two dimensional array of LED chips (item 301, with the plane of the light emitting surface indicated as 305) at its back focal plane, or Fourier plane (306). Preferably the array of LED chips is arranged to be symmetrical about an optical axis of the optics, such as the optical axis of the lens 302. In one implementation of the embodiment, the chips in the array of LED chips are arranged such that they are closely and equally spaced in a periodic two dimensional array. A composite lens set with the same focal length but with correction for aberrations can also be used instead of the double-convex lens in (302). A mask/aperture (303) in the optical path of the beam and placed at or near the Fourier plane (306) is then used to mask off or filter higher order frequencies of different wavelengths, leaving only the lower ones of different wavelengths. This mask can be a thin metal plate with a hole cut out or a transparency painted with black ink, for instance. In yet another embodiment that is more sophisticated, a dot matrix Liquid Crystal Display (LCD) can be used to dynamically form the shape of the mask 303 by electronically turning on or off an individual light valve associated with each pixel over the display surface, when controlled by a controller in a manner known to those skilled in the art. This allows the users to precisely target particular spatial frequencies and block them out almost in real time. A second lens (304), in this specific case a plano-convex lens with focal length $f_2$, is then used to image the filtered Fourier Transform and create a second Fourier Transform of it at infinity if the lens 304 is placed in front of the Fourier plane 306 at a distance d that is chosen to be equal to its focus length $f_2$. The distance d can be arbitrarily deviated from focus length $f_2$ for varying the spot size of the optical beam that exits the lens 304. The beam exiting lens 304 is projected onto an object for illumination. In one implementation of an embodiment, lens 304 collimates the beam onto an object for illumination.

FIGS. 3B(a) through 3B(e) show a numerical simulation of the embodiment of FIG. 3A, where a three color array (shown in FIG. 3B(a) and corresponding to items 301 and 305 in FIG. 3A) is used as the optical input. The Fourier Transform of the array as shown in FIG. 3B(b), corresponding to the Fourier plane (306) in FIG. 3A, is a pattern of closely and equally spaced spots in a two dimensional array corresponding to the different spatial frequency components of the array. The brightest spots which are near the center correspond to low frequencies which will be selected or passed in the cross-shaped aperture by the filter mask shown in FIG. 3B(c), and as item 303 in FIG. 3A. The cross-shaped aperture by the filter mask shown in FIG. 3B(c) will filter out the higher spatial frequencies except for the zero order and selected ones of the low order (e.g. first order or first and second orders) frequencies. The Fourier Transform after filtering is shown in FIG. 3B(d), and corresponds to the location indicated by 307 in FIG. 3A. The filtered Fourier Transform, when Fourier Transformed again, will then produce a slowly varying distribution that looks homogeneous as shown in FIG. 3B(e), which is the optical output at the location indicated by 308. It is also important to note that all the colors from the different array regions (red, green, and blue), are superimposed at the center of the Fourier Transform. This embodiment of the present invention can therefore mix three different colors without the need for light scramblers, by filtering the Fourier Transform.

Instead of being placed at location 303 in FIG. 3A, the mask can also be placed in the optical path further downstream from location 303, such as a locations between lens 304 and location 308, before the resulting beam of mixed colors reaches a desired object for illuminating the object. Such and other variations are within the scope of the invention.

In addition to using an array comprised of red, green, and blue LEDs or other light emitters, the same light mixing apparatus of the present invention can also be used with light emitting arrays comprised of other wavelengths. In addition to narrow-spectrum sources such as LEDs, it is possible to use LEDs that have had their emitting top surface coated with phosphors. The phosphors absorb energy from a higher-energy, lower-wavelength LED, typically a blue LED, and emit borader-spectrum light of lower energy and higher wavelength. Blue LEDs that are coated with phosphors that emit in the yellow and orange ranges of the spectrum emit a broad-spectrum white light, with color temperature that is dependent on the type(s) of phosphors used, as well as the application process. By using so-called "phosphor white" LEDs of various color temperature, combined with narrow-spectrum LEDs of other wavelengths, it is possible to create a surface-emitting array that emits white light of variable color temperature. The light mixing functions of the present invention also apply to the mixing of white light from surface-emitting arrays that utilize phosphor white LEDs of various color temperatures.

FIGS. 3C(a) through 3C(e) show another numerical simulation of the embodiment in FIG. 3A, except the concentric rings array shown in FIG. 3C(a) is used as the optical input at 301 in FIG. 3A. Preferably the concentric rings array is centered about an optical axis, such as that f lens 302. The Fourier Transform of each concentric ring is what is known as an "Airy Pattern" in which the Fourier Transforms of the concentric rings not only overlap, but which also have a central peak that contains the vast majority of the optical power, and can be closely approximated by a Gaussian distribution. The distribution resulting from Fourier Transforming the Airy functions, after filtering using the mask with a pin hole aperture shown in FIG. 3C(c), then looks even more like a Gaussian (FIG. 3C(e)).

Two LED array patterns, as shown in FIG. 3B(a) and FIG. 3C(a), are delineated in the above description for the purposes of illustration. Other array patterns are also within the scope of the present invention. Though Light Emitting Diode (LED) arrays are likely to be most popular in the immediate future, the patterned solid-state light emitting array concept extends to various other devices such as Organic Light Emitting Diodes (OLED) and Vertical-Cavity Surface-Emitting Lasers (VCSEL), liquid crystal displays, carbon nano-tube field emitting displays, and other surface emitting light sources as well. LED chips used by prior art illuminators can be arranged to approximate the different geometries needed for this Fourier Transform method to be useful, such as the concentric rings embodiment shown in FIG. 3C(a). This exemplary arrangement is shown in FIG. 4B, in which multiple square-shaped LED chips are arranged in a pattern consisting of concentric rings. Alternatively, LED chips could be diced into or fabricated directly in the shape of concentric rings, as shown in FIG. 4A. Electric wires 402 may be used to connect the chips to appropriate circuitry (not shown) for driving the chips.

Figure 5:
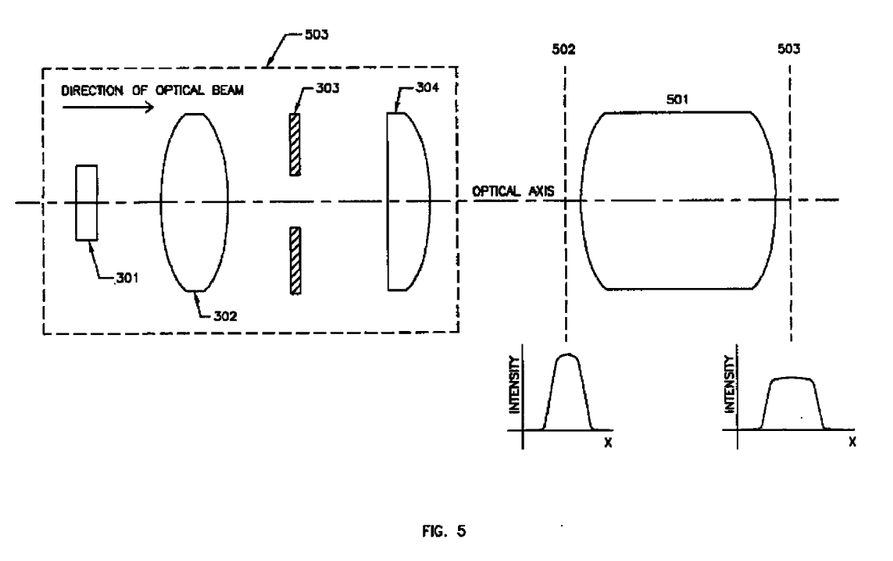
FIG. 5 is a representation of one embodiment of the present invention in which the approximately Gaussian and spatially mixed distribution outputted from the embodiment in FIG. 3A, using the concentric ring array in FIG. 3C(a) (all of the components except for a subsequent beam transformer enclosed by a dashed box), is transformed from a Gaussian spatial distribution into a "top-hat" spatial distribution via a subsequent beam transformer.

Gaussian spatial distributions, such as is produced by the embodiment of the present invention shown in FIGS. 3C(a) though 3C(e), are commonly encountered when working with lasers and hence there already exist numerous optical beam shapers that can transform a Gaussian beam into a "top-hat" distribution, for instance. The Lambertian spatial profile which an individual LED chip outputs is typically difficult to reshape and hence being able to transform it into a more usable intermediate spatial distribution will be useful in many applications. The optical output of filtered Fourier transform described in the present invention makes the optical output of the array emission closer to a Gaussian distribution for some cases of array configurations. A representative embodiment of a Gaussian-to-top-hat converter using the present invention is shown in FIG. 5. Each of the embodiments of the present invention shown in FIGS. 3A through 3C(e), as well as in FIGS. 4A and 4B is contained within the dashed lines 503 on the left side of FIG. 5. The Gaussian-to-top-hat beam converter is shown as element 501. The Gaussian distribution at the input to the converter (502), is converted to a top-hat distribution at the output of the converter (503) before the light beam with such distribution is projected onto an object (not shown) for illumination.

Figure 6:
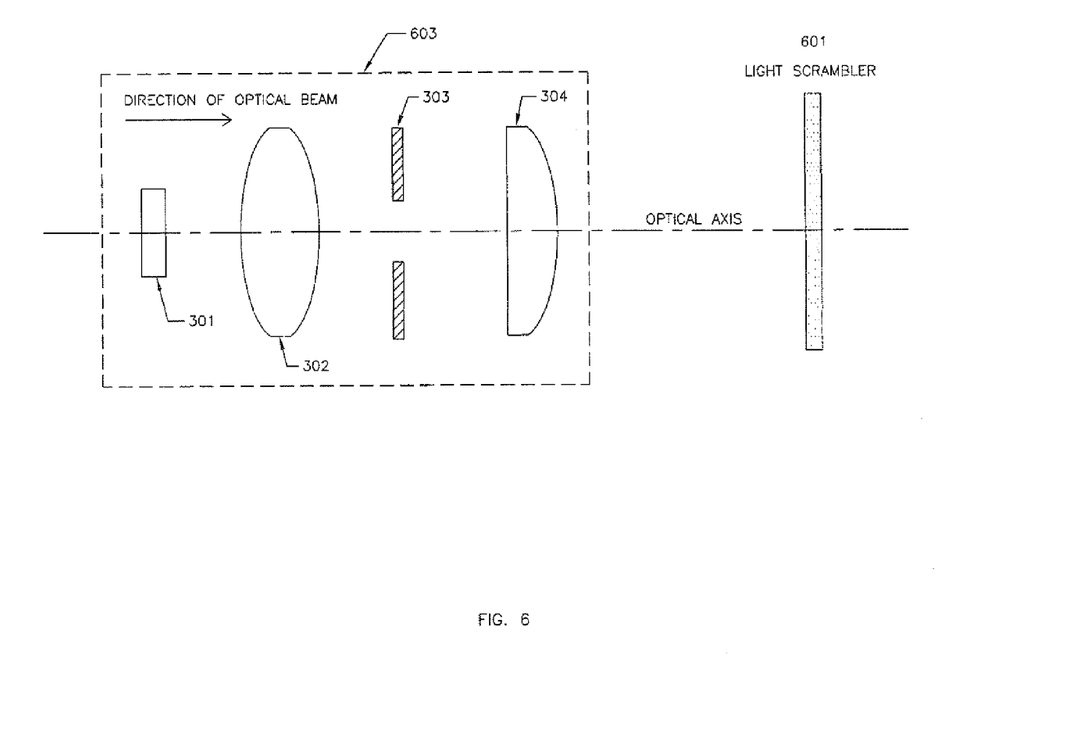
FIG. 6 is a representation of one embodiment of the present invention in which a light scrambler, in this case a diffuser plate, is used after the embodiment from FIG. 3A to further mix the light.

In cases where an even higher degree of uniformity or homogeneity is required, it is possible to use a secondary light scrambler to further mix the light, as shown in FIG. 6. Each of the embodiments of the present invention shown in FIGS. 3A through 3C(e), as well as in FIGS. 4A and 4B is contained within the dashed lines 603 on the left side of FIG. 6. A light scrambler, such as a diffuser plate (601), provides additional mixing of the optical output from the embodiment of FIG. 3A before the light beam is projected onto an object (not shown) for illumination.

While the invention has been described by reference to various embodiments, it will be understood that modification changes may be made without departing from the scope of the invention which is to be defined only by the appended claims or their equivalents.

I claim:

1. A light mixing illuminator for illuminating an object, comprising:
    an array of light emitting elements wherein the elements emit light of different wavelengths;
    a first optical device that focuses the light from the elements to a light pattern at the Fourier plane of the first optical device, so that the light pattern is a spatial Fourier Transform of the light from the elements;
    a mask having an aperture, wherein said mask is located at or near the Fourier plane and selectively blocks some of the spatial frequency components of light from the elements without blocking at least the zero spatial frequency components of the light from the elements; and
    an objective that projects the light passed by the aperture to a region on said object, said objective creating a spatial Fourier Transform in said region of the light passed by the aperture, and wherein the light emitting elements are arranged so that at least the zero spatial frequency components of light of the different wavelengths from the elements substantially overlap in said region on said object.

2. The illuminator of claim 1, wherein the light emitting elements are arranged in a two dimensional array.

3. The illuminator of claim 2, wherein the two dimensional array is periodic.

4. The illuminator of claim 2, wherein the aperture is in the shape of a cross.

5. The illuminator of claim 1, wherein the light emitting elements are arranged symmetrically about an optical axis of the optical device.

6. The illuminator of claim 5, wherein the light emitting elements are arranged in concentric rings, or in an approximate concentric rings configuration, centered substantially about said optical axis of the optical device.

7. The illuminator of claim 6, wherein the aperture is in the shape of a pin hole.

8. The illuminator of claim 1, wherein said objective collimates light from said region onto the object.

9. The illuminator of claim 1, wherein the light projected by the objective has a substantially Gaussian intensity distribution, said illuminator further comprising a converter for converting a Gaussian distribution of light intensity within said region to a top hat distribution.

10. The illuminator of claim 1, said illuminator further comprising a light scrambler in an optical path between the objective and the object to further mix the light imaged to the object.

11. The illuminator of claim 1, wherein the mask blocks substantially all spatial frequency components of light from the elements from the Fourier plane except the zero spatial frequency components.

12. The illuminator of claim 1, wherein said objective comprises a lens or a lens set.

13. The illuminator of claim 1, said mask comprising a LCD display that is controlled to alter the size and shape of the aperture of the mask.

14. The illuminator of claim 1, wherein the elements comprise light emitting diodes.

15. A method for illuminating an object, comprising:
    causing an array of light emitting elements to emit light of different wavelengths and form at least a first or a second pattern;
    focusing, by means of an optical device, the light from the elements to a light pattern at a Fourier plane of the optical device, so that the light pattern is a Fourier Transform of the light from the elements;
    selectively blocking some of spatial frequency components of light from the elements and passing at least the zero spatial frequency components of the light from the elements, at or near the Fourier plane; and
    projecting the light passed to a region on said object, wherein said projecting creates a Fourier Transform of the light passed in said region, and wherein the light emitting elements are arranged so that at least the zero spatial frequency components of light of the different wavelengths from the elements substantially overlap in said region on said object.

* * * * *